(12) United States Patent
Yamazaki

(10) Patent No.: US 8,776,628 B2
(45) Date of Patent: Jul. 15, 2014

(54) TRANSMISSION OF MOTORCYCLE

(75) Inventor: Masato Yamazaki, Shizuoka-Ken (JP)

(73) Assignee: Suzuki Motor Corporation, Hamamatsu-Shi, Shizuoka-Ken (JP)

( * ) Notice: Subject to any disclaimer, the term of this patent is extended or adjusted under 35 U.S.C. 154(b) by 203 days.

(21) Appl. No.: 13/335,156

(22) Filed: Dec. 22, 2011

(65) Prior Publication Data
US 2012/0118091 A1 May 17, 2012

(51) Int. Cl.
*F16H 3/08* (2006.01)
*F16H 3/089* (2006.01)
*F16H 61/04* (2006.01)

(52) U.S. Cl.
CPC .............. *F16H 3/089* (2013.01); *F16H 61/04* (2013.01); *F16H 2003/0811* (2013.01); *F16H 2061/0474* (2013.01)
USPC .............................................. 74/325; 74/339

(58) Field of Classification Search
USPC ........................................ 74/325, 335, 339
See application file for complete search history.

(56) References Cited

U.S. PATENT DOCUMENTS

| 4,869,353 | A | * | 9/1989 | Ohtsuki et al. | 192/53.31 |
| 4,876,907 | A | * | 10/1989 | Andersson et al. | 74/331 |
| 7,472,616 | B2 | * | 1/2009 | Dreher et al. | 74/336 R |
| 7,507,182 | B2 | * | 3/2009 | Matsumura et al. | 477/174 |

FOREIGN PATENT DOCUMENTS

JP 2000205352 7/2000

* cited by examiner

*Primary Examiner* — Ha D Ho
(74) *Attorney, Agent, or Firm* — Barnes & Thornburg LLP

(57) ABSTRACT

A motorcycle having a transmission which includes a counter shaft to which a rotation of a crankshaft disposed in an engine is transmitted and a drive shaft to which a rotation of the counter shaft is transmitted. A pair of drive gears mounted on the counter shaft so as to be rotated integrally with the counter shaft, and a pair of driven gears mounted on the drive shaft so as to be meshed with the pair of drive gears, respectively, to be rotatable therewith, and a friction ring is interposed between the pair of driven gears.

4 Claims, 17 Drawing Sheets

TRANSMISSION OF MOTORCYCLE

PRIORITY CLAIM

This patent application claims priority to Japanese Patent Application No. 2010-291651, filed 28 Dec., 2010, the disclosure of which is incorporated herein by reference in its entirety.

BACKGROUND

1. Field

Disclosed embodiments relate to a transmission of a motorcycle.

2. Related Art

Generally, a transmission of a motorcycle includes a counter shaft to which a rotation of a crankshaft provided in an engine is transmitted through a clutch, and a drive shaft to which a rotation of the counter shaft is transmitted. When the drive shaft is rotated, the rotation thereof is transmitted to the drive shaft to thereby enable the motorcycle to run.

A plurality of drive gears are mounted on the counter shaft, and a plurality of driven gears always meshed with the drive gears are also mounted on the drive shaft.

In addition, the driven gears are rotatably mounted on the drive shaft in a gear change stage (i.e., speed shift stage) at which the drive gears are provided to be integrally rotatable with the counter shaft, and on the other hand, the driven gears are provided to be integrally rotatable with the drive shaft in a gear change state at which the drive gears are mounted on the counter shaft to be rotatable.

Further, a sliding dog gear that rotates integrally with the counter shaft or the drive shaft to be slidable is included in the drive gears and the driven gears, and the drive gears or the driven gears rotatable with respect to the counter shaft or the drive shaft are disposed adjacent to the sliding dog gear (hereinafter, these drive gears or driven gears may be referred to as "adjacent gears").

Furthermore, a dog clutch is composed of dog pieces provided at the respective gears adjacent to the sliding dog gear, and when the gears are shifted, a gear-meshing state in a predetermined speed stage is shifted by meshing one of the dog clutches, by using a gear shift operation mechanism, so as to engage the adjacent gears with the counter shaft or the drive shaft.

However, at a time when the gears are shifted as described above, rotational speeds of the sliding dog gear and the adjacent gears are generally different from each other. Therefore, rotational speeds of the dog pieces composing the dog clutch are also different from each other, thus causing a shift shock in a case when the dog pieces with different rotational speeds are meshed with each other, thus being inconvenient.

In order to address this inconvenient matter, Japanese Patent Laid-open Publication No. 2000-205352 (Patent Document 1) discloses an arrangement in which a friction ring is disposed between the counter shaft and a fifth-speed drive gear rotatably provided on the counter shaft. By employing such a configuration, a rotation resisting force due to friction occurs between the counter shaft and the fifth drive gear at the same time when a clutch is disengaged to thereby slow down the counter shaft, thus enabling to reduce a difference of the rotational speeds between the counter shaft and the drive shaft at the time of shifting gears. According to such operation as mentioned above, it becomes possible to reduce also a difference of the rotational speeds between the sliding dog gear and the adjacent gears and a difference of the rotational speeds between the respective dog pieces, thus enabling to reduce the above-described shift shock associated with the differences of the rotational speeds.

In the conventional technology such as mentioned above, for example, when slowing down the counter shaft using the friction ring, there occurs a problem of causing a difference of rotational speeds between members between which the friction ring is interposed. Then, in view of the above matter, a difference of rotational speeds between the counter shaft and the fifth drive gear in each gear position will be described hereunder with reference to FIG. 17.

First, when driving with the fifth drive gear, a dog piece provided in a fourth drive gear, which is the sliding dog gear, is meshed a dog piece of the fifth drive gear, the counter shaft and the fifth drive gear are integrally rotated, the relative number of rotations (a difference of the number of rotations) of the counter shaft and the fifth drive gear is zero "0", and thus there occurs no difference of the rotational speeds between the counter shaft and the fifth drive gear.

Meanwhile, when driving with the gear positions other than the fifth drive gear, the counter shaft and the fifth drive gear are not integrally rotated, and at this time, when a primary reduction ratio (gear ratio of a primary drive gear provided at the crankshaft and a primary driven gear provided at the counter shaft) is considered, the following equation is established:

(number of rotations of counter shaft)=(engine rpm× primary reduction ratio)

In contrast, as for the number of rotations of the fifth drive gear, the drive shaft is slowed down with respect to the counter shaft at a reduction ratio of a selected gear position, and the fifth drive gear is driven to rotate by a fifth driven gear that rotates integrally with this drive shaft, whereby the following equation is established:

(number of rotations of fifth drive gear)=(engine rpm× primary reduction ratio×reduction ratio of selected gear position×<number of fifth driven gear teeth/number of fifth drive gear teeth>)

Accordingly, since the numbers of rotations of the counter shaft and the fifth drive gear are different from each other, the relative number of rotations becomes not "0", thereby causing the difference of the rotational speeds between the counter shaft and the fifth drive gear.

As is apparent from the above two equations, in an occasion of the engine rpm being constant, although the number of rotations of the counter shaft is constant, the number of rotations of the fifth drive gear changes according to the reduction ratio of the selected gear position. Therefore, the relative number of rotations between the counter shaft and the fifth drive gear also changes according to the reduction ratio of the selected gear position (see FIG. 17). Accordingly, there causes a problem such that when the friction ring is arranged between the counter shaft and the fifth drive gear as in the above-described conventional example, a rotation resisting force differs for every gear shift operation depending on the each selected gear position, and in such occasion, a rider cannot obtain a stable operation feeling.

Still furthermore, in the conventional arrangement, since the reduction ratio of each gear position is designed so as to increase as the gear change position becomes smaller, the relative number of rotations of the counter shaft and the fifth drive gear increases in low gear positions, such as the first drive gear and the second drive gear as compared with high gear positions, such as the fourth to sixth drive gears (see FIG. 17). Accordingly, in the arrangement in which the friction ring is arranged between the counter shaft and the fifth drive gear as in the above-described conventional example, the number of operational rotations of the friction ring in the low gear positions is increased, and in a case when a particularly large friction torque is required, an inconvenient matter will occur in durability of the friction ring.

SUMMARY

Disclosed embodiments provide a transmission of a motorcycle capable of giving a stable gear shift operation feeling to a rider and improving durability of a friction ring by making the rotation resisting force constant even in gear shift operation to any gear position by suppressing the number of operational rotations of the friction ring.

One disclosed embodiment provides a transmission for a motorcycle including: a counter shaft to which a rotation of a crankshaft disposed in an engine is transmitted; a drive shaft to which a rotation of the counter shaft is transmitted; a pair of drive gears mounted on the counter shaft so as to be rotated integrally with the counter shaft; a pair of driven gear mounted on the drive shaft so as to be meshed with the pair of drive gears, respectively, to be rotatable therewith; and a friction ring interposed between the pair of driven gears.

In such a configuration, a rotation resisting force that acts between the pair of driven gears depends on a reduction ratio in a predetermined gear position at which the pair of drive gears and the pair of driven gears are provided and also depends on an engine rpm, and accordingly, the rotation resisting force is not influenced by the reduction ratio of a gear position selected at the time of shifting the gears. Therefore, when the engine rpm is constant, the rotation resisting force between the pair of driven gears becomes constant even in the gear shift operation taken to any gear position. Accordingly, a gear shift operation feeling can be made constant by interposing the friction ring between the pair of driven gears, thus enabling a rider to obtain the stable operation feeling.

In one disclosed embodiment, it may be desired that the pair of the driven gears have inner peripheral end portions to which a hub portion is provided, and the friction ring is fitted in an outer peripheral surface of one of the hub portion.

According to this arrangement, it becomes possible to make large a diameter of the friction ring as compared with a case where the friction ring is interposed between the counter shaft and the fifth drive gear. Therefore, rigidity of the friction ring can be made high to thereby increase the rotation resisting force.

It may be also desired that the pair of driven gears are arranged adjacent to each other, one of the driven gears is formed with a recessed portion facing another driven gear such that at least a part of the friction ring enters the recessed portion in regard to an axial direction of the drive shaft.

According to such arrangement, since the friction ring is interposed between the pair of driven gears arranged adjacent to each other, the transmission can be prevented from increasing in size. Furthermore, at least the part of the friction ring enters the concave portion provided in the surface of the one driven gear facing the other driven gear, and it becomes possible to further shorten an axial dimension of the pair of driven gears.

Furthermore, it may be desired that the one of the driven gears has an diameter larger than that of the another driven gear, and wherein the friction ring is fitted in an outer peripheral surface of the hub portion of the one of the driven gears, and a friction ring contact portion contacting an outer diameter portion of the friction ring is formed on a surface of the another driven gear facing the one of the driven gears.

According to this arrangement, the axial dimension of the pair of driven gears can be reduced while making the diameter of the friction ring much larger to increase the rotation resisting force by providing the recessed portion at the driven gear with a larger diameter.

Furthermore, a bush may be interposed between the drive shaft and the pair of driven gears, and the bush is formed with an oil supply hole at a position corresponding to a fitting position of the friction ring in regard to the axial direction of the drive shaft.

According to such arrangement, since the friction ring achieves excellent lubrication performance, a rubber portion can be suppressed from wearing and degrading to thereby enhance the durability of the friction ring.

It may be further desired that the pair of drive gears are integrally formed as sliding dog gears movable in an axial direction of the counter shaft by means of a shift fork.

Accordingly, the distance can be shorten between the pair of driven gears always meshing with these drive gears, thus preventing the deterioration of a strength of a portion supporting the friction ring.

Consequently, as mentioned above, a rider can obtain a stable gear shift operation feeling, and the number of operational rotations of the friction ring can be suppressed to thereby improve the durability of the friction ring by making the rotation resisting force constant even if the gear takes nay gear shift position in operation.

The nature and further characteristic features of the present invention will be made clearer from the following descriptions made with reference to the accompanying drawings.

DESCRIPTION OF THE DISCLOSED EMBODIMENTS

Disclosed embodiments will be described hereinafter with reference to the accompanying drawings.

Figure 1:
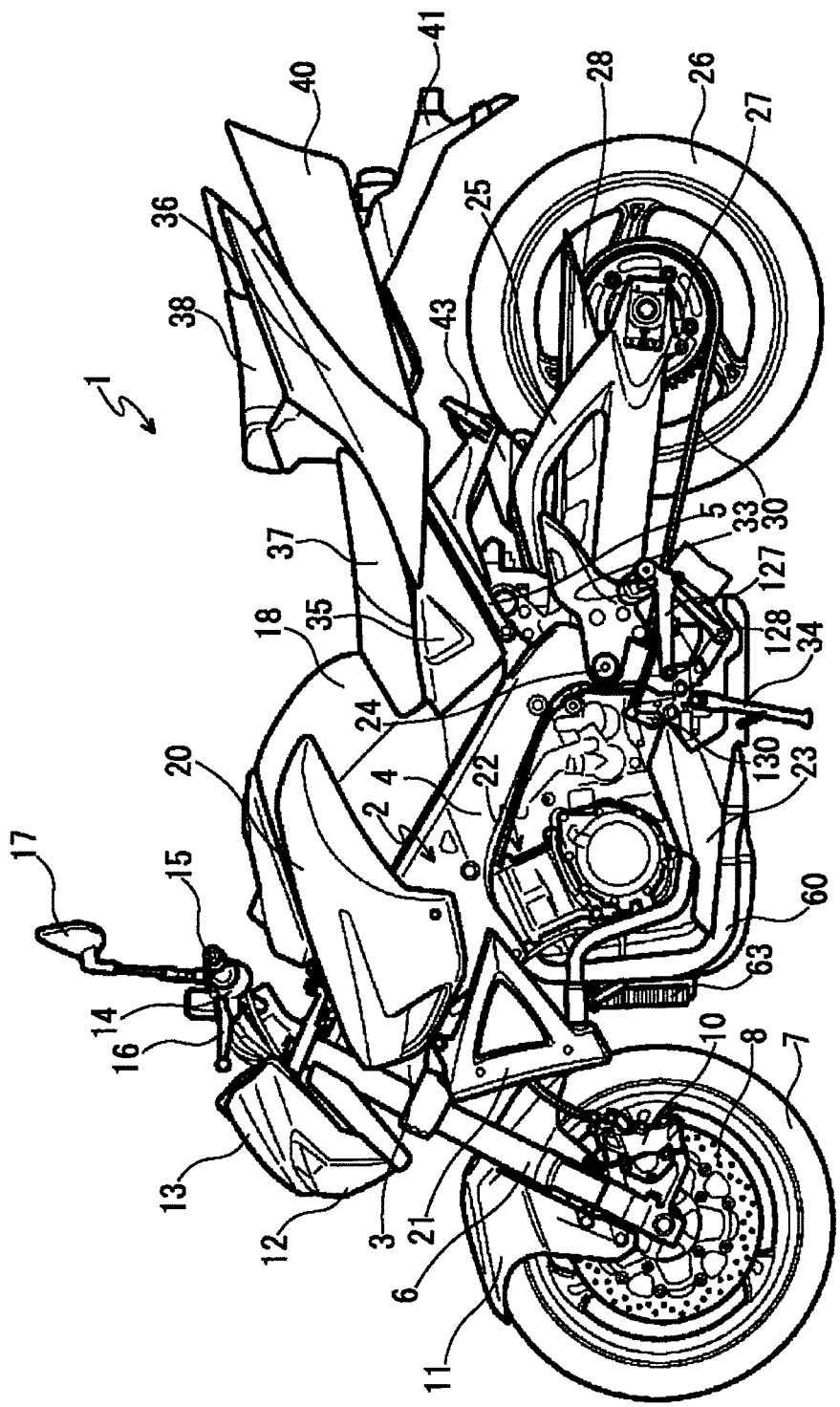
FIG. 1 is a left side view showing a motorcycle to which a transmission according to a first disclosed embodiment is assembled.

It is further to be noted that terms "upper", "lower", "right", "left" and other like terms representing directions or positions are used herein with reference to the illustration of the drawings or in a state of a motorcycle shown in FIG. 1.

A first disclosed embodiment will be described hereunder.

FIG. 1 shows an entire configuration of a motorcycle 1 to which the first disclosed embodiment is mounted.

In FIG. 1, a motorcycle 1 has a vehicle body frame 2 constituting a framework thereof is provided in the motorcycle 1. This vehicle body frame 2 is, for example, a twin-tube type frame, which mainly comprises: a head pipe 3 arranged at a front upper end of the body frame 2; a lateral pair of right and left main frames 4 extending from the head pipe 3 toward a rear lower side; and a pair of right and left seat rails 5 extending from a rear portion of the main frame 4 toward a rear upper side.

A pair of right and left front forks 6 are supported rotatably in a horizontal direction by the head pipe 3. A front wheel 7 is pivotally supported by a lower end of the front fork 6, and a brake disc 8 is provided at the front wheel 7 so as to rotate integrally with the front wheel 7. A front brake caliper 10 is fixed to the lower end of the front fork 6 which performs braking function to the front wheel 7 by compressing the brake disc 8 using a brake pad, not shown, provided inside the front brake caliper 10. A front fender 11 is fixed to a lower portion of the front fork 6 so as to cover an upper portion of the front wheel 7.

A head lamp housing 13 in which a head lamp 12 is housed is attached to an upper portion of the front fork 6. A handle bar 14 is fixed to an upper end of the front fork 6 so as to extend in the horizontal direction, and handle grips 15 are mounted to right and left end portions of the handle bar 14, in which a clutch lever 16 is attached to the left handle grip 15, and a brake lever (not shown) is attached to the right handle grip 15.

Rearview mirrors 17 are fixed to lateral both end-side portions of the handle bar 14.

A fuel tank 18 is disposed between the pair of main frames 4 and a fuel tank cover 20 is attached to a front portion of the main frames 4 so as to cover both sides of a front portion of the fuel tank 18. A frame body cover 21 is disposed to a front lower side of the fuel tank cover 20. An engine 22 is mounted at a lower side of the fuel tank 18, and an under cowling 23 is provided so as to cover a lower portion of the engine 22.

A pivot shaft 24 is disposed between rear lower portions of the pair of right and left main frames 4, and a front end portion of a swing arm 25 is supported swingably in a vertical direction by the pivot shaft 24. A rear wheel 26 is pivotally supported by a rear end portion of the swing arm 25.

A driven sprocket 27 is provided at the rear wheel 26 so as to rotate integrally with the rear wheel 26. A rear end portion of a drive chain 30 having an upper portion covered with a chain cover 28 is wound around the driven sprocket 27, and a front end portion of the drive chain 30 is wound around a drive sprocket 31 (see FIG. 3).

A foot rest 33 is fixed to a rear lower portion of the each mainframe 4, and a prop stand 34 is attached to a lower end of the left main frame 4.

Side covers 35 are attached to both sides of front portions of the pair of right and left seat rails 5, and a seat cowling 36 is provided at rear sides of the side covers 35. A rider seat 37 is disposed on a rear side of the fuel tank 18 at an upper side of the side covers 35. A tandem seat 38 is also disposed on a rear upper side of the rider seat 37.

A muffler 40 is provided at a lower side of the seat cowling 36, and a rear fender 41 is mounted on a lower side of the muffler 40 so as to cover an upper side of the rear wheel 26. A pair of right and left pillion foot rests (foot rests for a fellow passenger) 43 are attached to front lower portions of the seat rails 5.

Next, a configuration of the engine 22 and a periphery thereof will be described hereunder with reference to FIGS. 2 to 9, in which it is to be noted that illustrations of cross sections of some members are omitted in FIG. 3.

Figure 2:
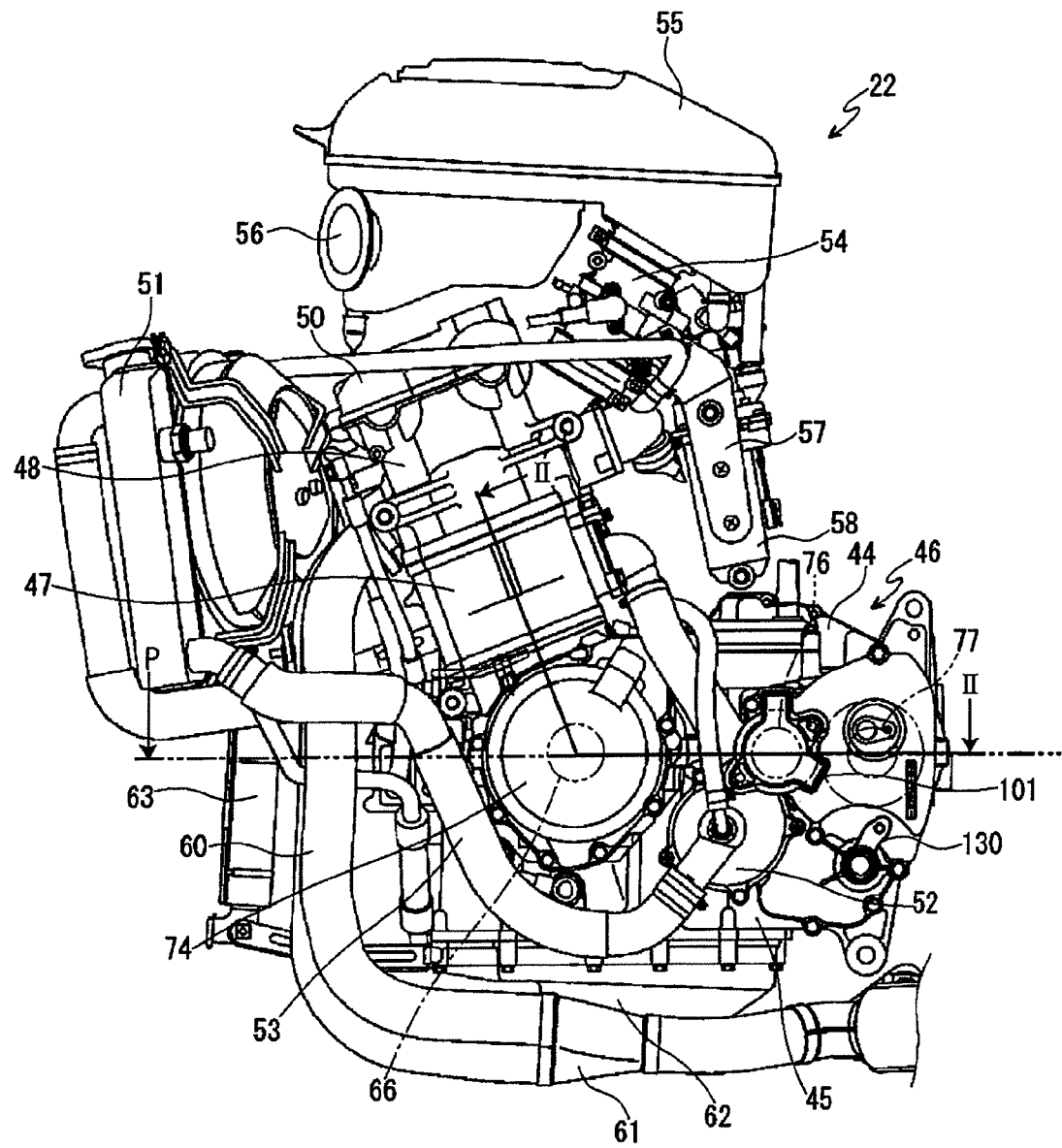
FIG. 2 is a left side view showing an engine in the motorcycle, in an enlarged scale, shown in FIG. 1.

The engine 22 is, for example, a water-cooling four-cylinder DOHC engine, and as shown in FIG. 2, the engine 22 comprises: a crankcase 46 composed of vertically dividable upper and lower crankcase parts (halves) 44 and 45; a cylinder 47 that is molded integrally with a front portion of the upper crankcase 44 so as to extend forward; a cylinder head 48 mounted on an upper side of the cylinder 47; and a head cover 50 that covers an upper surface of the cylinder head 48.

As shown in FIG. 1, a radiator 51 is arranged at a front side of the cylinder 47, the cylinder head 48, and the head cover 50 in a state of being covered with the frame body cover 21. The radiator 51 is connected to a water pump 52 through a hose 53. The water pump 52 is disposed on a rear side of the lower crankcase part 45, and the radiator 51 and the water pump 52 are connected through a water jacket, not shown, formed inside the cylinder 47 and the cylinder head 48, and another hose 53. According to such arrangement mentioned above. a cooling water circulation passage is composed to thereby cool the interiors of the cylinder 47 and the cylinder head 48.

Four throttle bodies 54 are arranged in parallel at a rear upper side of the cylinder head 48. A lower end portion of the throttle body 54 is connected to a rear portion of the cylinder head 48, and an upper end portion of the throttle body 54 is connected to a rear lower portion of an air cleaner 55 disposed so as to extend from an upper side of the head cover 50 to an upper side of the throttle body 54. The cleaner 55 is provided with an air inlet 56 at a front lower side thereof. A fuel pump 58 is attached to the throttle body 54 through a bracket 57, and an injector, not shown, mounted at the throttle body 54 and the fuel tank 18 are connected to each other through the fuel pump 58.

According to such configuration as mentioned above, an air suctioned into the throttle body 54 from the air inlet 56 through the air cleaner 55 is mixed with a fuel injected from the injector, and the mixed air-fuel mixture is supplied inside the cylinder head 48.

Four exhaust pipes 60 are connected in parallel to a front portion of the cylinder head 48. The exhaust pipes 60 are collected at a collective portion 61 provided at a lower side of the crankcase 45 and then connected to the muffler 40 (see FIG. 1). Thus, the exhaust gas from the cylinder head 48 can be discharged to the rear side of the motorcycle 1 through the exhaust pipes 60 and the muffler 40.

An oil pan 62 is disposed at a lower end of the lower crankcase 45, and an oil cooler 63 communicating with the oil pan 62 is provided at a front side of the exhaust pipes 60. According to such structure, an oil stored in the oil pan 62 is supplied to oil passages 82, 113, etc., which will be described hereinafter, after cooled by the oil cooler 63.

The cylinder 47 is formed with four cylinder bores, not shown, therein, and a piston 64 is housed to be vertically reciprocally movable in the each cylinder bore. As shown in FIG. 3, a piston pin 65 is provided for each piston 64.

In the crankcase 46, a crankshaft 66 is pivotally supported on a matching (mating) surface P of the upper crankcase part 44 and the lower crankcase part 45 (see a two-dot chain line of FIG. 2, and hereinafter, merely referred to as the "matching surface P").

The crankshaft 66 includes: crank journals 67 pivotally supported in the crankcase 46; crank webs 68 formed in a pair between the adjacent crank journals 67; a crank pin 70 provided between the pair of crank webs 68 eccentrically from an axis of the crankshaft 66; a magneto 71 for power generation provided at a left end portion of the crankshaft 66 to be integrally rotatable with the crankshaft 66; and a primary drive gear 72 provided at the left crank web 68 of the crank pin 70 located at a right end portion of the crankshaft 66.

The crank pin 70 is located at a position corresponding to each piston 64, and the piston pin 65 of the piston 64 and the crank pin 70 are coupled to each other by a connecting rod 73, whereby vertical motion of the piston 64 is converted into rotational motion of the crankshaft 66 through the connecting rod 73. The magneto 71 is covered with a magneto cover 74 disposed on a left side surface of the crankcase 46.

A transmission 75 is provided at a rear side of the crankshaft 66 within the crankcase 46. The transmission 75 is, for example, a six-speed transmission, and comprises: a counter shaft 76 positioned on the rear side of the crankshaft 66 in parallel with the crankshaft 66; drive gears A1 to A6 mounted on the counter shaft 76; a drive shaft 77 positioned on a rear side of the counter shaft 76 in parallel with the crankshaft 66 and the counter shaft 76; and driven gears B1 to B6 mounted on the drive shaft 77 to be always meshed with the drive gears A1 to A6, respectively. Further, it is to be noted that the drive gears A1 to A6 denote first to sixth drive gears, respectively, and the driven gears B1 to B6 denote first to sixth driven gears, respectively, in the accompanying drawings and the present specification.

Figure 4:
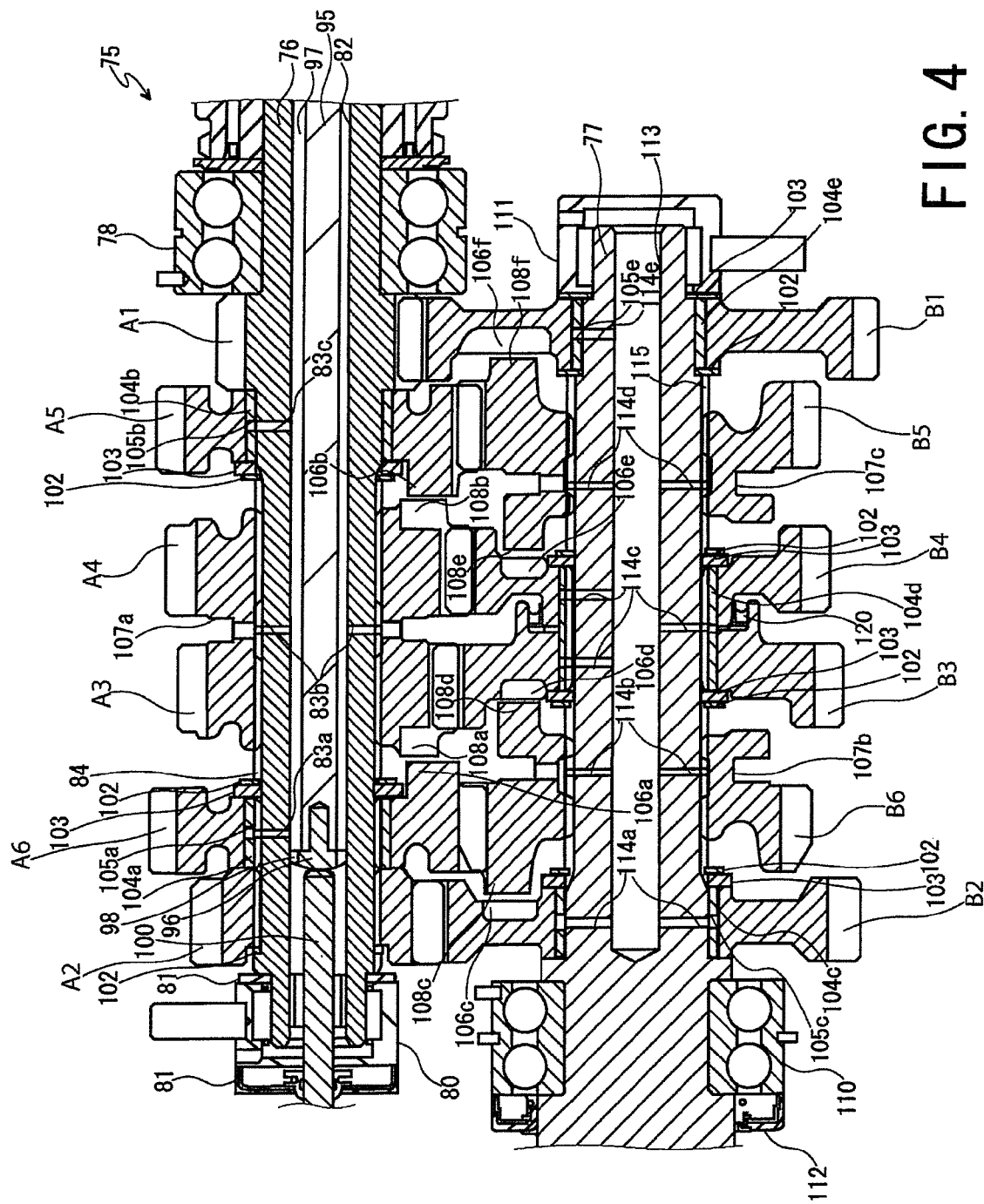
FIG. 4 is a sectional view showing a neutral state of the transmission of the motorcycle according to the first disclosed embodiment.

As shown in FIG. 4, for example, the counter shaft 76 is pivotally supported at a right side portion thereof by a ball bearing 78 as a bearing, and is also pivotally supported at a left side portion thereof by a needle roller bearing 80 as a bearing, and an oil seal 81 is disposed on both sides of the needle roller bearing 80. The counter shaft 76 is provided with a hollow oil passage 82 so as to extend in an axial direction thereof, and at a central portion in a horizontal direction and both-side portions of the oil passage 82, oil supply holes 83a to 83c perpendicular to the oil passage 82 are disposed toward the a peripheral surface of the counter shaft 76. A spline 84 is formed on the peripheral surface of the counter shaft 76 so as to extend from the central portion in the horizontal direction to the left end portion thereof.

Figure 3:
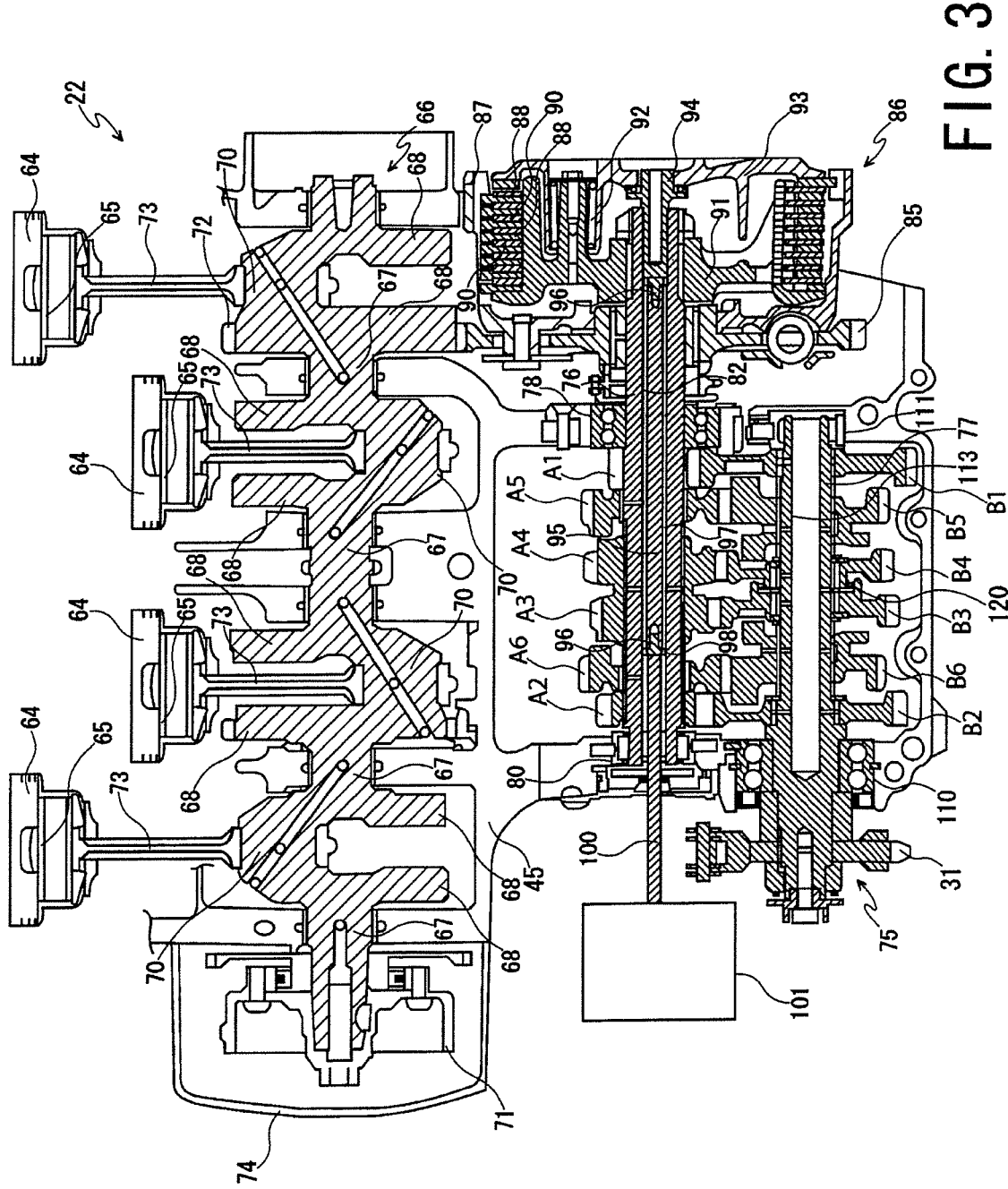
FIG. 3 is a sectional view taken along a line of FIG. 2.

As shown in FIG. 3, a primary driven gear 85 that meshes with the primary drive gear 72 of the crankshaft 66 is rotatably supported at a right side portion of the counter shaft 76, and a clutch 86 is provided at a right side portion of the primary driven gear 85. The clutch 86 is, for example, a wet multiplate clutch, and includes: a clutch housing 87 provided so as to be integrally rotatable with the primary driven gear 85; a plurality of drive plates 88 housed in the clutch housing 87 to be slidably in the axial direction; a clutch sleeve hub 91 fixed to the counter shaft 76 and provided, at an outer periphery thereof, with a plurality of driven plates 90 that alternately overlap with the drive plates 88; a pressure disc 93 provided for the clutch sleeve hub 91 through a clutch spring 92 so as to be integrally rotatable with the clutch sleeve hub 91; and a push piece 94 disposed in contact with the pressure disc 93 and inserted in a right end portion of the oil passage 82 of the counter shaft 76.

A clutch rod 95 is inserted in the oil passage 82 of the counter shaft 76, and clutch push heads 96 are fixed to both end portions of the clutch rod 95. Notches 97 and 98 are formed in peripheral surfaces of the clutch rod 95 and the clutch push head 96, respectively (see FIG. 4, etc.) so that the oil is circulated in the oil passage 82 through the notches 97 and 98.

The clutch push head 96 located at the right end portion of the clutch rod 95 is in contact with the push piece 94 of the clutch 86, and the clutch push head 96 located at the left end portion of the clutch rod 95 is in contact with a clutch push rod 100 inserted in a left end portion of the oil passage 82 of the counter shaft 76. The clutch push rod 100 is connected to a hydraulically-driven clutch release cylinder 101, which is in turn connected to the clutch lever 16 through a hydraulic hose.

Further, as shown in FIG. 4, for example, the drive gears A1 to A6 are arranged in an order of A2, A6, A3, A4, A5 and A1 from the left side therein. Hereinafter, the drive gears A1 to A6 will be described in this order.

The drive gear A2 and the drive gear A6 are restricted from sliding in the axial direction of the counter shaft 76 by a circlip 102 provided at a left side of an inner periphery of the drive gear A2 and a circlip 102 provided on a right side of an inner periphery of the drive gear A6 through a washer 103. The drive gear A2 is spline-coupled (i.e., splined) with the counter shaft 76 to be integrally rotatable therewith.

The drive gear A6 is in contact with a right side surface of the drive gear A2. The drive gear A6 is disposed around a bush 104a spline-coupled with the counter shaft 76 so as to be freely rotatable with respect to the counter shaft 76. In the bush 104a, an oil supply hole 105a is formed to a position corresponding to the oil supply hole 83a formed to a left side portion of the counter shaft 76. A dog piece 106a is formed on a right side surface of the drive gear A6.

The drive gears A3 and A4 are provided at positions corresponding to the oil supply hole 83b of the counter shaft 76 to be integrally with each other. The drive gears A3 and A4 are spline-coupled to the counter shaft 76 and serve as sliding dog gears to be integrally rotatable and slidable with the counter shaft 76 in the axial direction.

A fork groove 107a is formed between the drive gears A3 and A4, and dog pieces 108a and 108b are provided at a left side surface of the drive gear A3 and a right side surface of the drive gear A4.

The drive gear A5 is rotatably mounted to the counter shaft 76 through a bush 104b. The bush 104b is formed with an oil supply hole 105b at a position corresponding to an oil supply hole 83c of the counter shaft 76. The drive gear A5 is restricted from sliding in the axial direction of the counter shaft 76 by the circlip 102 disposed on a left side of an inner periphery of the drive gear A5 through the washer 103. A dog piece 106b is formed to a left side surface of the drive gear A5. The drive gear A1 is formed integrally with the counter shaft 76 in contact with a right side surface of the drive gear A5.

The drive shaft is pivotally supported at a left side portion thereof by a ball bearing 110 as a bearing and also pivotally supported at a right end portion thereof the drive by a needle roller bearing 111 as a bearing, and an oil seal 112 is provided at a left side portion of the ball bearing 110. The drive shaft 77 has a hollow structure and is provided with an oil passage 113 in an axial direction thereof, and in the oil passage 113, a plurality of oil supply holes 114a to 114e perpendicular to the oil passage 113 are formed in a peripheral surface of the drive shaft 77.

A spline 115 is formed on the peripheral surface of the drive shaft 77 from a left side portion of a center in a horizontal direction to a right side portion. The drive sprocket 31 is mounted on a left end portion of the drive shaft 77 (see FIG. 3), and the front end portion of the drive chain 30 is wound around the drive sprocket 31 as described above. Accordingly, the rotational motion of the drive shaft 77 is transmitted to the rear wheel 26 through the drive sprocket 31, the drive chain 30, and the driven sprocket 27.

Figure 5:
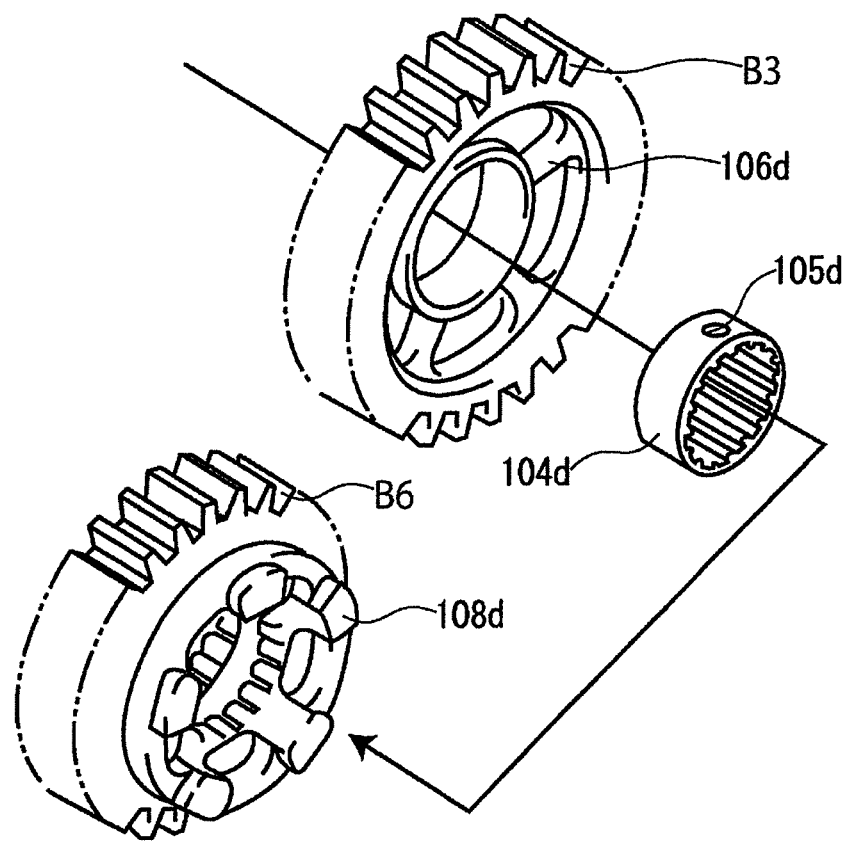
FIG. 5 is an exploded perspective view of a dog clutch in the motorcycle shown in FIG. 1.

The driven gears B1 to B6 are disposed as B2, B6, B3, B4, B5, and B1 from a left side in this order. Hereinafter, the driven gears B1 to B6 will be described in this order. Further, it is to be noted that only parts of the driven gears B3 and B6 (dog clutch portions) are illustrated in FIG. 5.

The driven gear B2 is rotatably mounted to the drive shaft 77 through a bush 104c. The bush 104c is formed with an oil supply hole 105c at a position corresponding to an oil supply hole 114a of the drive shaft 77. The driven gear B2 is restricted from sliding in the axial direction of the drive shaft 77 by the circlip 102 arranged on a right side of an inner periphery of the driven gear B2 through the washer 103. A dog piece 106c is provided at a right side surface of the driven gear B2.

Further, the driven gear B6 is disposed at a position corresponding to an oil supply hole 114b of the drive shaft 77. The driven gear B6 is spline-coupled with the drive shaft 77 and serves as a sliding dog gear to be rotatable integrally with the drive shaft 77 and to be slidable in the axial direction. A dog piece 108c is formed to a left side surface of the driven gear B6, and a dog piece 108d is formed to a right side surface of the driven gear B6 (see FIG. 5). A fork groove 107b is provided on an outer peripheral surface of the driven gear B6.

Figure 6:
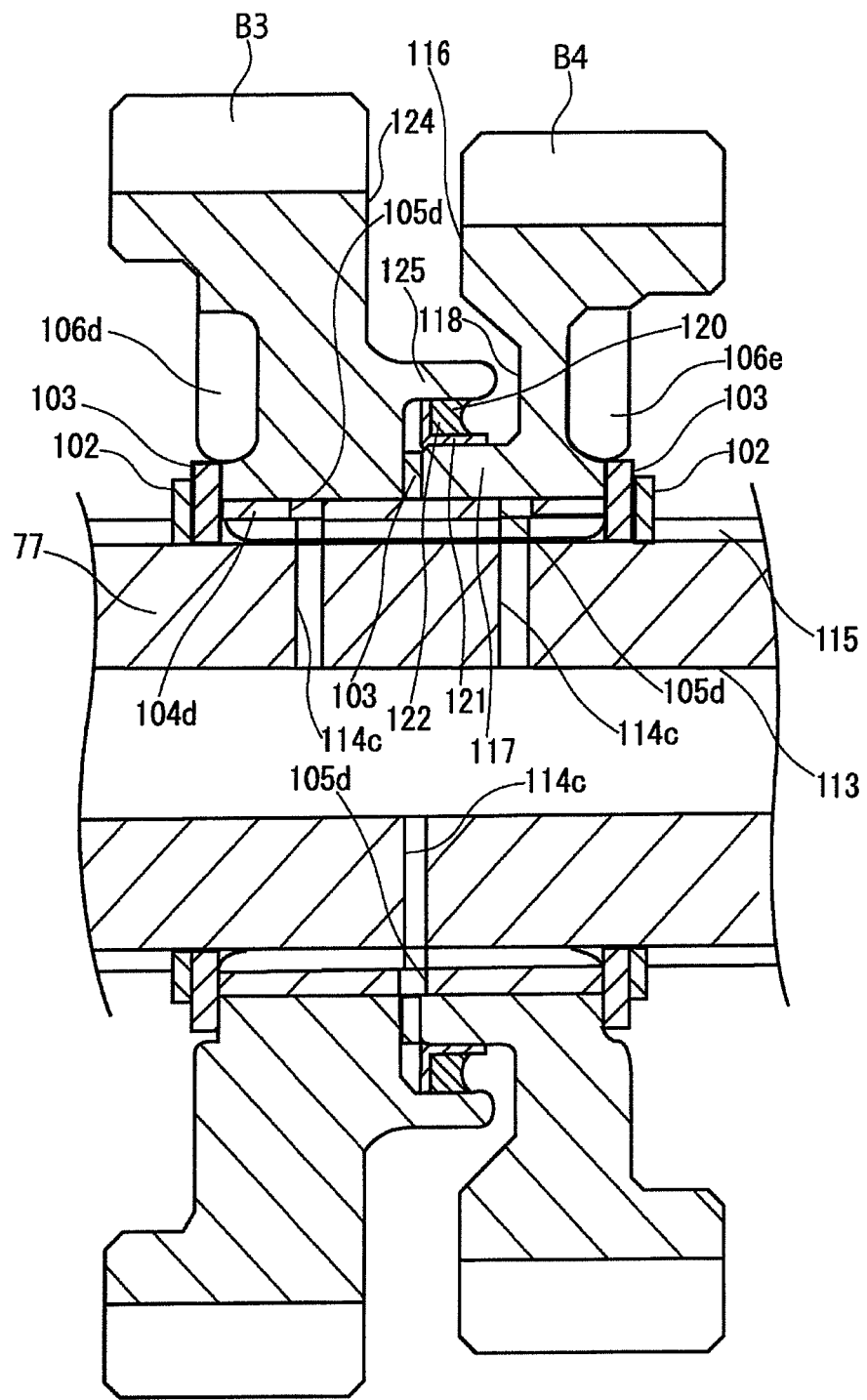
FIG. 6 is a sectional view illustrating a periphery of a third driven gear and a fourth driven gear in the transmission of the motorcycle according to the first disclosed embodiment.
Figure 7:
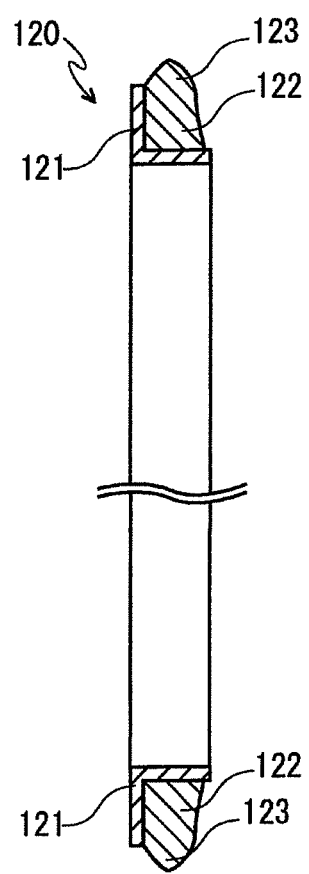
FIG. 7 is a sectional view showing a friction ring of the transmission of the motorcycle of FIG. 1.

As best shown in FIG. 6, the driven gears B3 and B4 are arranged adjacent to each other and around a bush 104d spline-coupled with the drive shaft 77 to thereby freely rotatable with respect to the drive shaft 77. In the bush 104d, an oil supply hole 105d is formed to a position corresponding to an oil supply hole 114c of the drive shaft 77. The driven gears B3 and B4 are restricted from sliding in the axial direction of the drive shaft 77 by the circlip 102 disposed at both-side portions of inner peripheries of the driven gears B3 and B4 through the washer 103. A dog piece 106d is disposed to a left side surface of the driven gear B3 (see FIG. 5), and a dog piece 106e is disposed to a right side surface of the driven gear B4.

The washer 103 is interposed between the driven gear B3 and the driven gear B4. A hub portion 117 is provided at an inner peripheral end portion of a surface 116 (left surface in the embodiment) of the driven gear B4 facing to the driven gear B3. A concave portion 118 is formed at an outer diameter side of the hub portion 117, and a friction ring 120 is interposed between the driven gear B3 and the driven gear B4 in a state where a part of the friction ring 120 enters the concave portion 118.

The friction ring 120 is composed of an annular metal ring 121 having substantially L-section and an annular rubber ring 122 fixed to an outer periphery of the metal ring 121. The friction ring 120 is fixed to the driven gear B4 by the metal ring 121 which is fitted in an outer peripheral surface of the hub portion 117. A lip portion 123 that protrudes outwardly in a curved manner is formed to an outer peripheral portion of the rubber ring 122 (see FIG. 7).

A friction ring contact (support) portion 125 is mounted to a right surface 124 (in the present embodiment) of the driven gear B3 facing the driven gear B4 so as to protrude toward the concave (recessed) portion 118, and the lip portion 123 of the rubber ring 122 abuts, under pressure, against the inner peripheral surface of the friction ring contact portion 125 contacting an outer diameter portion of the friction ring 120.

As shown in FIG. 4, etc., the driven gear B5 is disposed to a position corresponding to an oil supply hole 114d of the drive shaft 77. The driven gear B5 is spline-coupled with the drive shaft 77 and serves as a sliding dog gear which is integrally rotatable with the drive shaft 77 and slidable in the axial direction. Dog pieces 108e and 108f are arranged on both-side surfaces of the driven gear B5, and a fork groove 107c is formed in an outer peripheral surface of the driven gear B5.

The driven gear B1 is mounted to the drive shaft 77 in a rotatable manner through a bush 104e. The bush 104e is provided with an oil supply hole 105e at a position corresponding to an oil supply hole 114e of the drive shaft 77. The driven gear B1 is restricted from sliding in the axial direction of the drive shaft 77 by the circlip 102 disposed on a left side of the inner periphery of the driven gear B1. A dog piece 106f is disposed to a left side surface of the driven gear B1.

A gear shift operation mechanism 126 is disposed near the transmission 75 configured as described above. The gear shift operation mechanism 126 mainly comprises, as shown in FIG. 1: a shift lever 127 disposed near the foot rest 33; a shift link rod 128 coupled to the shift lever 127; a shift link arm 130 having an upper end portion fixed to a front end portion of the shift link rod 128; a shift shaft 132 having a left end portion fixed to a lower end portion of the shift link arm 130 and having a right end portion provided with a shift drive gear 131, as shown in FIGS. 8 and 9; a gear shift cam 135, to which a shift driven gear 133 meshed with the shift drive gear 131 is attached through a shaft 134 so as to rotate integrally with the gear shift cam 135; and a pair of shift fork shafts 136a and 136b disposed between front and rear portions of the gear shift cam 135 in parallel with the gear shift cam 135.

Figure 8:
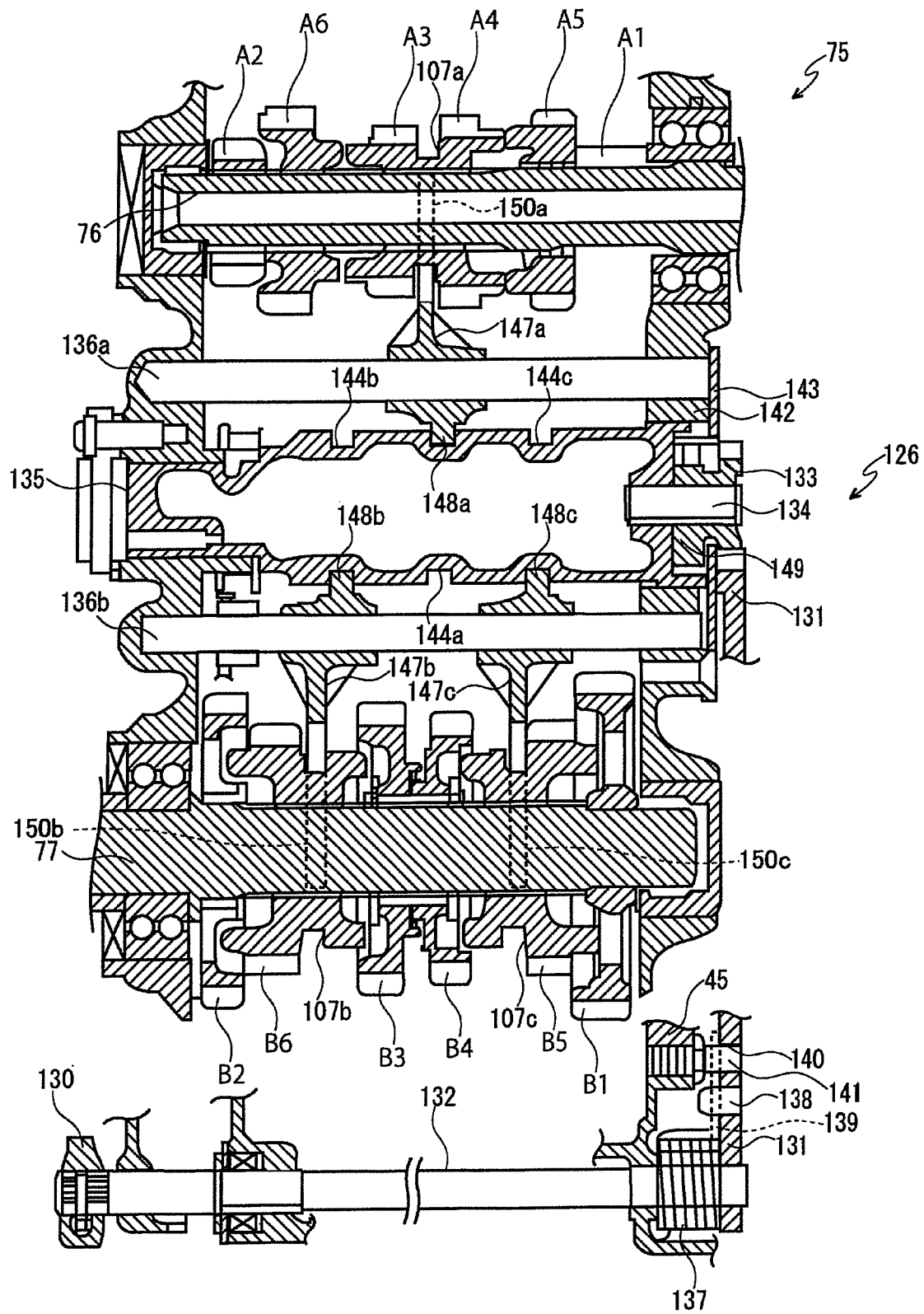
FIG. 8 is a developed sectional view showing the transmission of the motorcycle according to the first disclosed embodiment.

It is to be noted that the drive gears A1 to A6 and the driven gears B1 to B6 which are actually always meshed with each other are depicted as the separated ones since FIG. 8 shows a cross section developed so as to pass through centers of the counter shaft 76, the drive shaft 77, the gear shift cam 135, and the shift fork shafts 136a and 136b.

Figure 9:
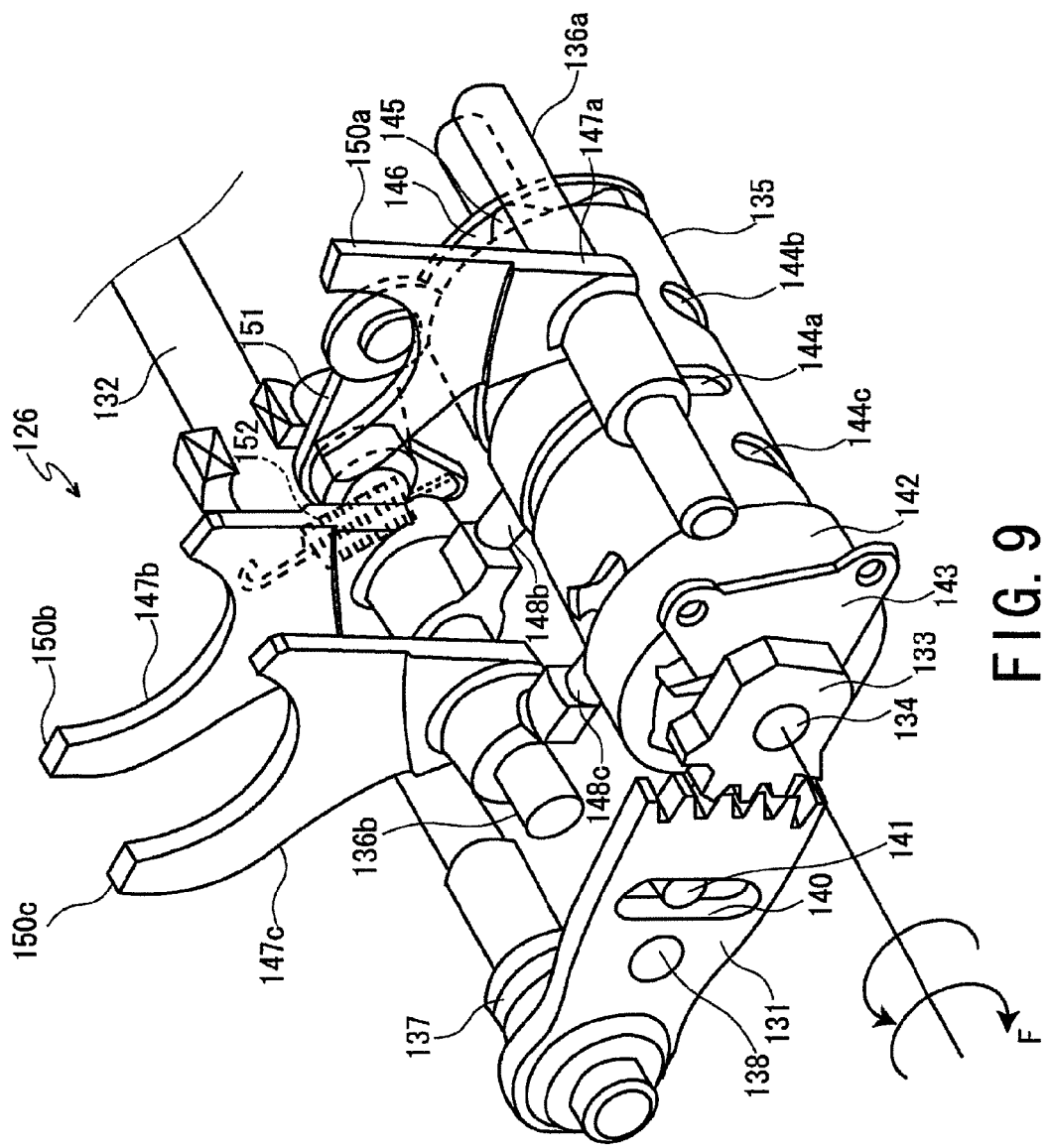
FIG. 9 is a perspective view showing a gear shift operation mechanism of the transmission of the motorcycle according to the first disclosed embodiment of FIG. 1.

As shown in FIGS. 8 and 9, at a right end portion of the shift shaft 132, a return spring 137 is arranged on a left side of the shift drive gear 131, and both end portions of the return spring 137 extend forward so as to constitute a vertical pair of bars 139.

The shift drive gear 131 is formed with a stopper 138 so as to protrude toward a left side at a central portion in the longitudinal direction of the shift drive gear 131, and a rotation angle restriction hole 140 that is longer in a vertical direction is formed in a front portion of the stopper 138. When a stopper 141 disposed to the lower crankcase 45 in a protruded manner is fitted into the rotation angle restriction hole 140, the rotation angle of the shift drive gear 131 is restricted. In addition, when both the stoppers 138 and 141 are held between the pair of bars 139, a neutral state of the shift drive gear 131 is held.

The shift driven gear 133 is provided with a pole holder 149 to be integrally rotatable therewith, and the pole holder 149 is housed in a pole housing 142 provided at a right end portion of the gear shift cam 135, and near the pole holder 149, a pole lifter 143 is fixed to the lower crankcase 45.

On a peripheral surface of the gear shift cam 135, cam grooves 144a to 144c are formed in the peripheral surface of the gear shift cam 135 at laterally central portion and both side portions thereof. A shift cam plate 145 is fixed to a left end portion of the gear shift cam 135 so as to be integrally rotatable therewith, and a plurality of recessed portions 146 for engagement are formed in an outer peripheral surface of the shift cam plate 145.

A shift fork 147a is attached to the laterally central portion of the shift fork shaft 136a to be slidable in the axial direction thereof, and shift forks 147b and 147c are attached to the lateral both side portions of the shift fork shaft 136b to be slidable in the axial direction thereof, respectively. The shift forks 147b and 147c are formed with pins 148a to 148c in a protruding manner and the pins 148a to 148c are fitted with cam grooves 144a and 144c, respectively.

The respective shift forks 147a to 147c are formed with fork sections 150a to 150c so as to protrude upward in a manner such that the fork section 150a rotatably holds a fork groove 107a formed between the drive gears A3 and A4, and the fork sections 150b and 150c also rotatably hold fork grooves 107b and 107c formed to the driven gears B6 and B5, respectively.

A shift cam stopper 151 is rotatably mounted at a left end portion of the shift shaft 132, and the shift cam stopper 151 includes a front end portion engaged with any one of the plurality of the engaging recessed portions 146 provided for the shift cam plate 145. A return spring 152 is placed at a lower end portion of the shift cam stopper 151, and by an urging force of the return spring 152, a front end portion of the shift cam stopper 151 and the engaging recessed portion 146 are held in their engaged state.

A clutch operation of the motorcycle 1 of the structure mentioned above will be described hereunder.

First, in a state where the clutch lever 16 is not gripped, the rotation of the crankshaft 66 is transmitted to the counter shaft 76 through the primary drive gear 72, the primary driven gear 85, the clutch housing 87, the drive plate 88, the driven plate 90, and the clutch sleeve hub 91 in this order. In thus manner, the counter shaft 76 is rotated at a predetermined revolution number in accordance with to a gear ratio (primary reduction ratio) of the primary drive gear 72 and the primary driven gear 85.

On the other hand, in a state where the clutch lever 16 is gripped, a hydraulic pressure is applied to the clutch release cylinder 101 through a hydraulic hose, not shown, and the clutch push rod 100 presses the pressure disc 93 to a right side through the clutch rod 95 and the push piece 94. According to this operation, the pressure disc 93 moves to the right against an urging force of the clutch spring 92, and a gap is generated between each drive plate 88 and each driven plate 90. As a result, the rotation of the clutch sleeve hub 91 stops even if the clutch housing 87 rotates, and the transmission of the rotation from the crankshaft 66 to the counter shaft 76 is released.

Next, the gear shift operation in the motorcycle 1 of the structure mentioned above will be described in consideration of a case of shifting up a gear for every gear position from a neutral state, as one example, with reference to FIG. 4 and FIGS. 10 to 15.

FIG. 4 shows the neutral state where the rotation from the crankshaft 66 is not transmitted to the drive shaft 77. When a driver disengages the clutch 86 and rotates the shift lever 127 upwardly by one stroke from the neutral state, the shift shaft 132 rotates through the shift link rod 128 and the shift link arm 130, and then, the shift drive gear 131 swings upwardly.

According to this operation, the shift driven gear 133 meshed with shift drive gear 131 rotates by approximately 60 degrees in a normal rotation direction F (see FIG. 9) to transmit the rotation of the shift driven gear 133 to the gear shift cam 135, and the gear shift cam 135 is then rotated by approximately 60 degrees in the normal rotation direction F.

Figure 10:
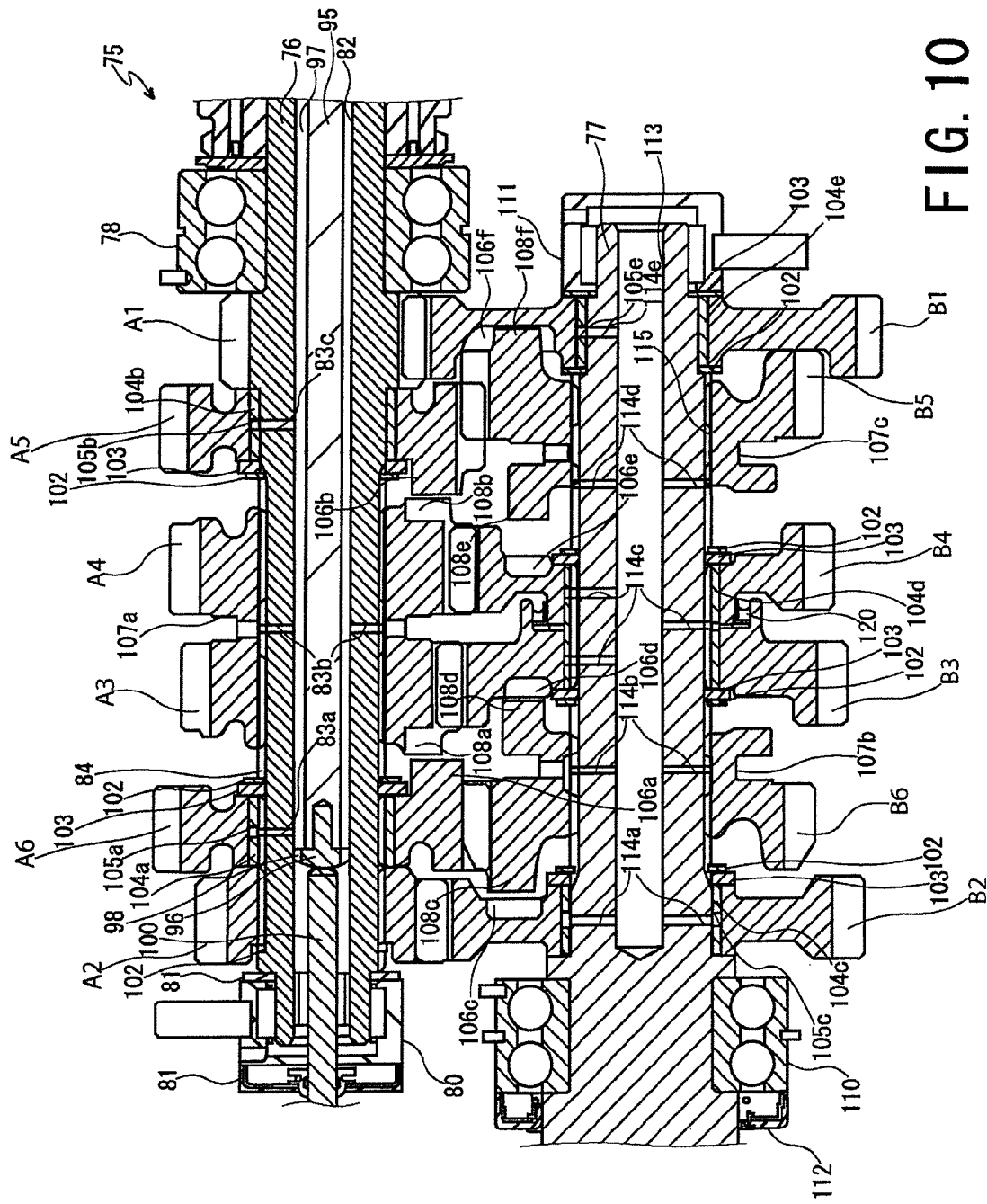
FIG. 10 is a sectional view showing a first gear state of the transmission in the motorcycle according to the first disclosed embodiment of FIG. 1.

According to the operation mentioned above, the pin 148c moves rightward along the cam groove 144c, the shift fork 147c and the driven gear B5 also move rightward together with the movement of the pin 148c, and then, the dog piece 108f disposed on the right side of the driven gear B5 is meshed with the dog piece 106f of the driven gear B1 as shown in FIG. 10. Then, the driven gear B1 is rotated integrally with the drive shaft 77, and the rotation of the counter shaft 76 is transmitted to the drive shaft 77, which is then rotated according to the reduction ratio of the first gear position.

Figure 11:
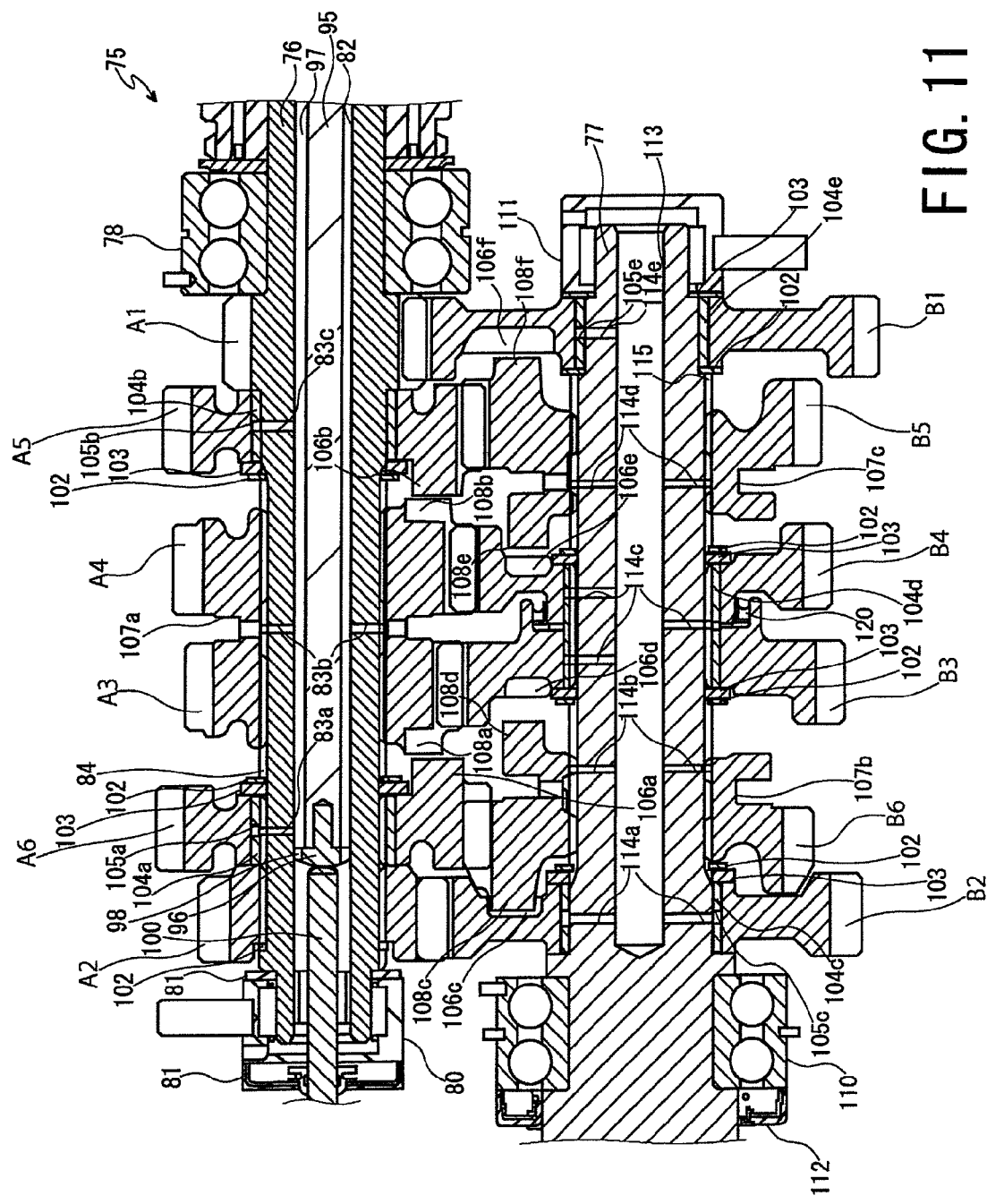
FIG. 11 is a sectional view showing a second gear state of the transmission of the motorcycle according to the first disclosed embodiment.

From this first gear state, when the gear shift cam 135 is rotated in the similar operation to that explained above by approximately 60 degrees in the normal rotation direction, the pin 148c moves leftward along the cam groove 144c, and the dog piece 108f located on the right side of the driven gear B5 and the dog piece 106f of the driven gear B1, now being meshed with each other, are released as shown in FIG. 11. Simultaneously, the pin 148b moves leftward along the cam groove 144b, and the dog piece 108c disposed on the left side of the driven gear B6 meshes with the dog piece 106c of the driven gear B2. Due to such meshing operation, the driven gear B2 rotates integrally with the drive shaft 77, and the drive shaft 77 rotates according to the reduction ratio of the second gear position.

Figure 12:
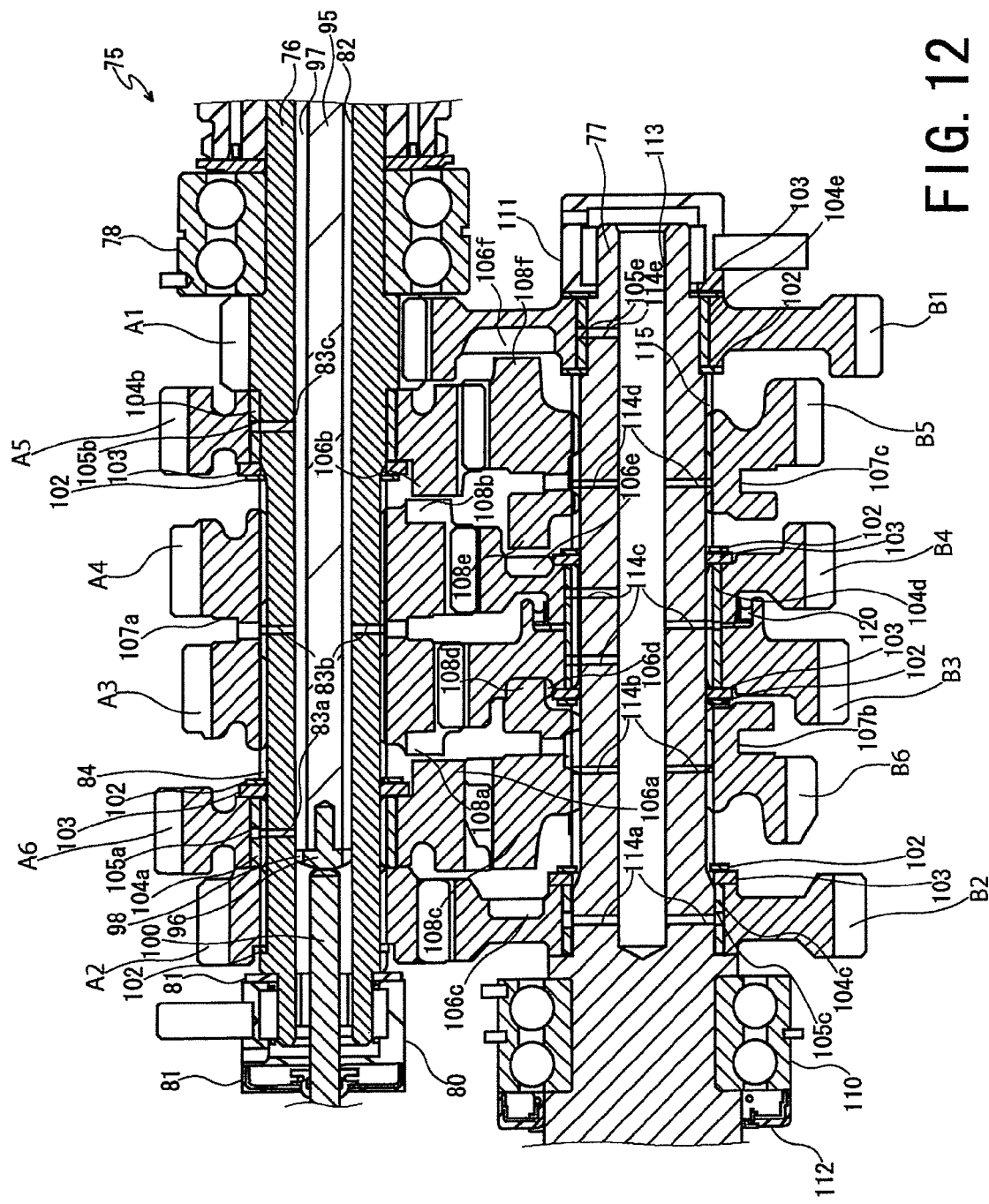
FIG. 12 is a sectional view showing a third gear state of the transmission of the motorcycle according to the first disclosed embodiment.

From this second gear state, when the gear shift cam 135 is rotated in the similar operation by approximately 60 degrees in the normal rotation direction F, the pin 148b moves to the right along the cam groove 144b, the dog piece 108c located at a left side of the driven gear B6 and the dog piece 106c of the driven gear B2, now being meshed with each other, are released as shown in FIG. 12, and the dog piece 108d disposed on the right side of the driven gear B6 meshes with the dog piece 106d of the driven gear B3. Due to such meshing operation, the driven gear B3 is rotated integrally with the drive shaft 77, and the drive shaft 77 is also rotated according to the reduction ratio of the third gear position.

Figure 13:
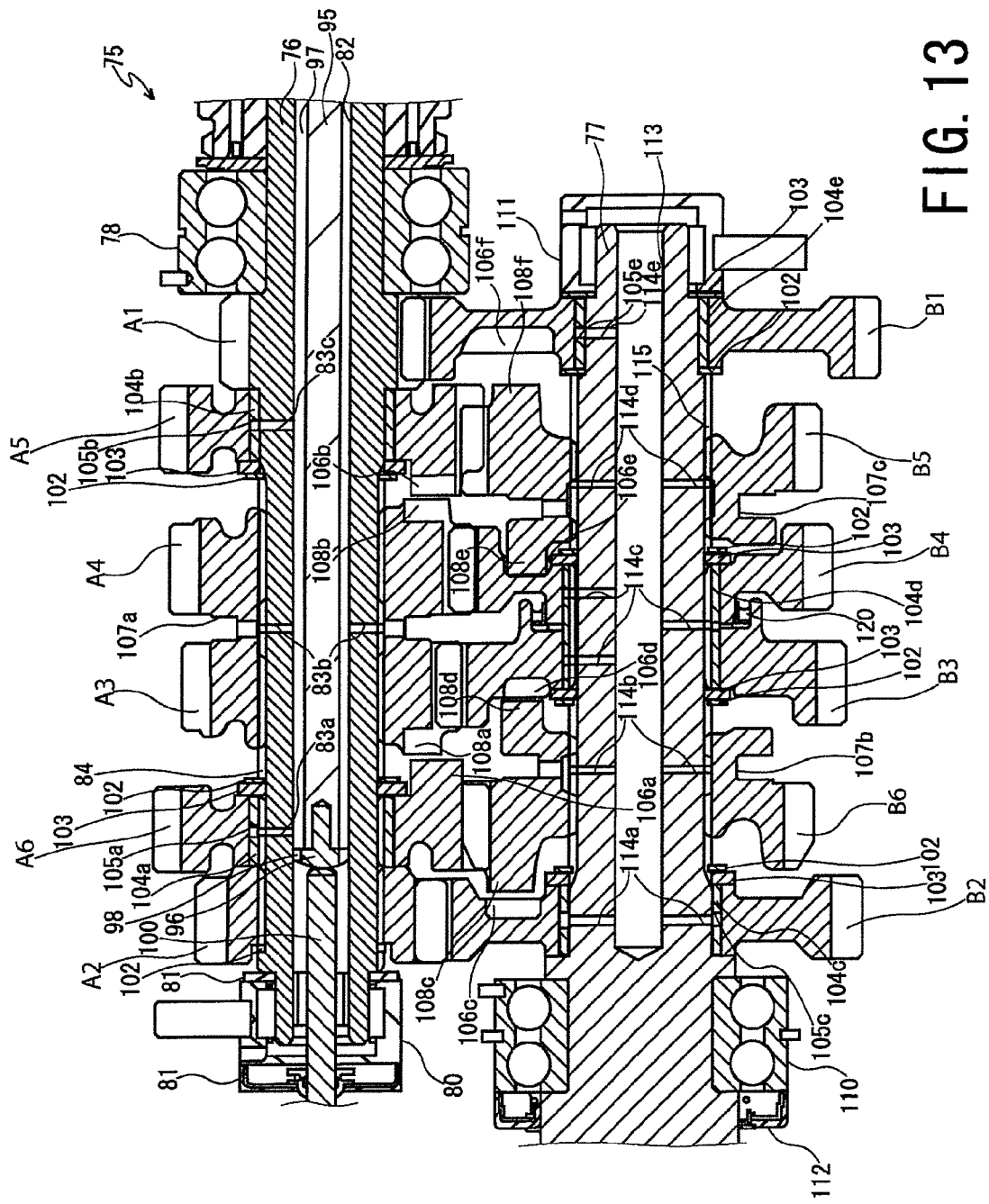
FIG. 13 is a sectional view showing a fourth gear state of the transmission of the motorcycle according to the first disclosed embodiment.

From this third gear state, when the gear shift cam 135 is rotated in the similar operation by approximately 60 degrees in the normal rotation direction F, the pin 148b moves leftward along the cam groove 144b, and the dog piece 108d disposed on the right side of the driven gear B6 and the dog piece 106d of the driven gear B3, now being meshed with each other, are released as shown in FIG. 13. Simultaneously, the pin 148c is moved leftward, and the dog piece 108e disposed on the left side of the driven gear B5 is also meshed with the dog piece 106e of the driven gear B4. Due to such meshing operation, the driven gear B4 is rotated integrally with the drive shaft 77, and the drive shaft 77 is also rotated according to the reduction ratio of the fourth gear position.

Figure 14:
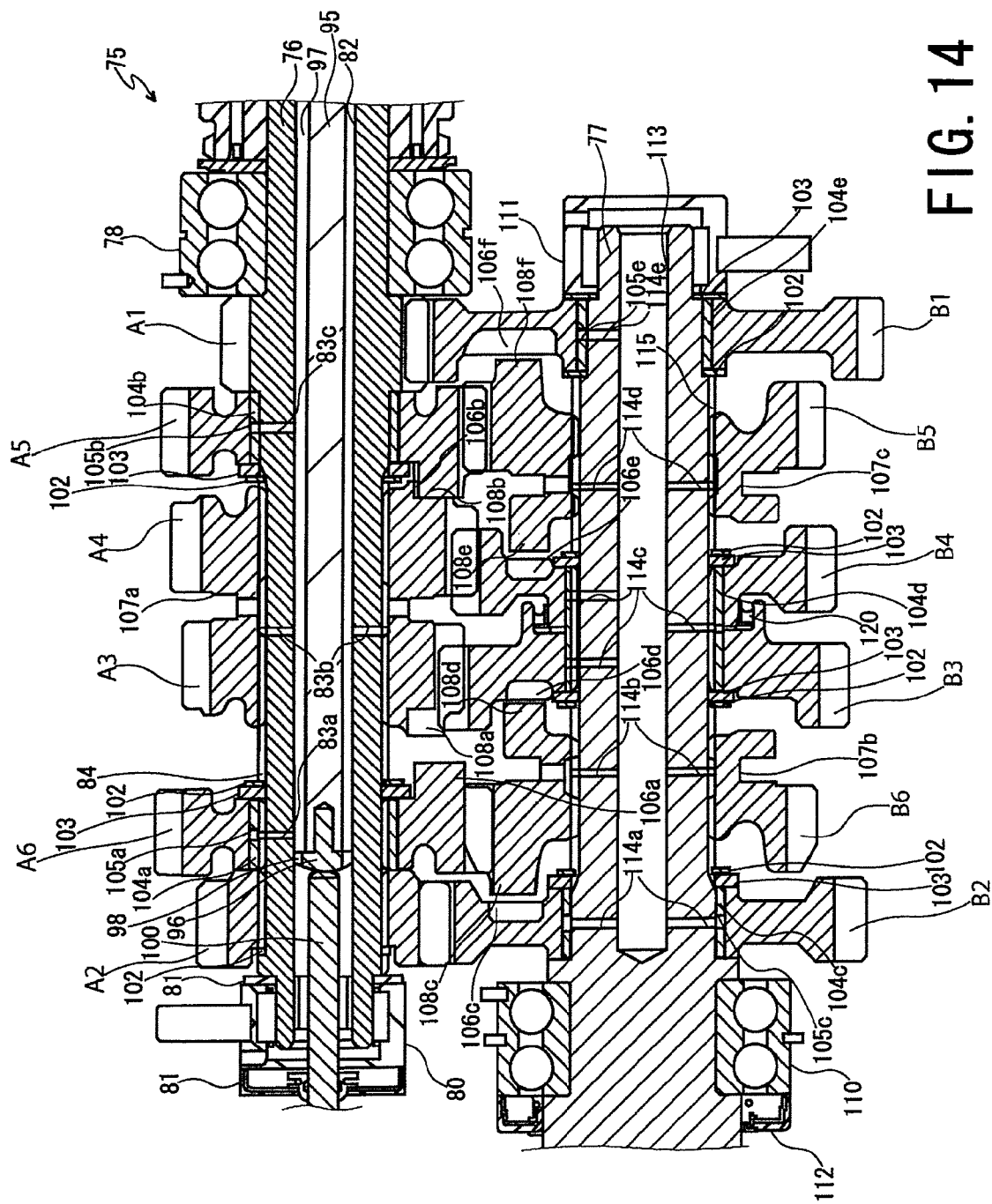
FIG. 14 is a sectional view showing a fifth gear state of the transmission of the motorcycle according to the first disclosed embodiment.

From such fourth gear state, when the gear shift cam 135 is rotated in the similar operation by approximately 60 degrees in the normal rotation direction F, the pin 148c moves rightward along the cam groove 144c, and the dog piece 108e located at the left side of the driven gear B5 and the dog piece 106e of the driven gear B4, now being meshed with each other, are released as shown in FIG. 14. Simultaneously, the pin 148a is moved rightward along the cam groove 144a, and the dog piece 108b of the drive gear A4 is meshed with the dog piece 106b of the drive gear A5. Due to such meshing opera-tion, the drive gear A5 is rotated integrally with the counter shaft 76, and the drive shaft 77 is rotated according to the reduction ratio of the fifth gear position.

Figure 15:
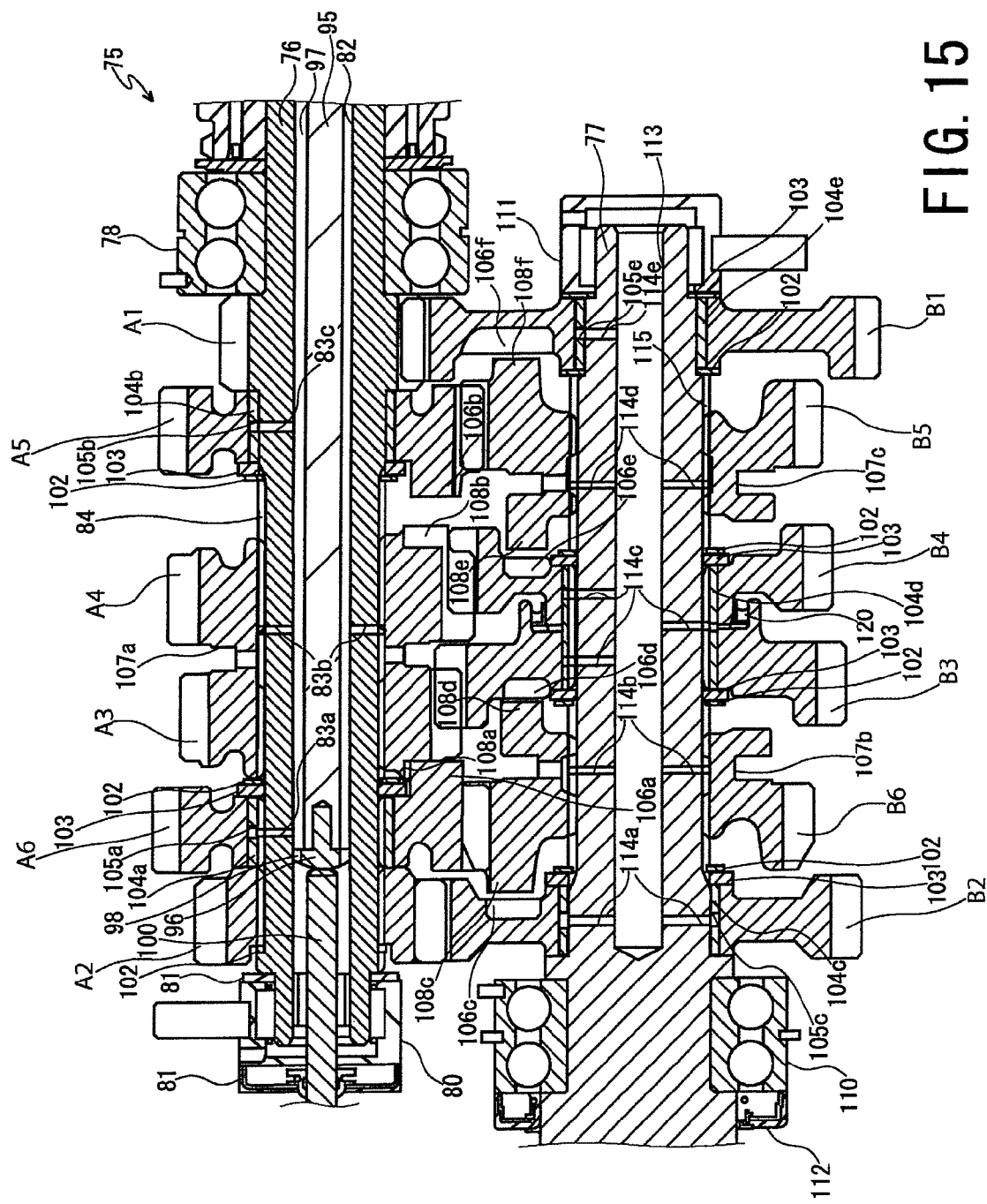
FIG. 15 is a sectional view showing a sixth gear state of the transmission of the motorcycle according to the first disclosed embodiment.

From such fifth gear state, when the gear shift cam 135 is rotated in the similar operation by approximately 60 degrees in the normal rotation direction F, the pin 148a moves leftward left along the cam groove 144a, the dog piece 108b of the drive gear A4 and the dog piece 106b of the drive gear A5, now being meshed with each other, are released as shown in FIG. 15, and the dog piece 108a of the drive gear A3 is meshed with the dog piece 106a of the drive gear A6. Due to such meshing operation, the drive gear A6 is rotated integrally with the counter shaft 76, and the drive shaft 77 is also rotated according to the reduction ratio of the sixth gear position.

Since the friction ring 120 is interposed between the driven gear B3 and the driven gear B4 in the embodiment as described above, the rotation resisting force due to friction occurs between the driven gear B3 and the driven gear B4 to thereby slow down the counter shaft 76 at the same time when the driver disengages the clutch 86 through the above-described gear shift operation. Therefore, it becomes possible to reduce a difference of the rotational speeds between the counter shaft 76 and the drive shaft 77 at the time of shifting the gears, and according to such operation, it also becomes possible to reduce a difference of the rotating speeds between the sliding dog gears (drive gears A3 and A4, and driven gears B5 and B6) and the adjacent gears (drive gears A5 and A6, and the driven gears B1 to B4), thus enabling to reduce the above-described shift shock caused in association with the differences of the rotating speeds.

In addition, since the driven gear B3 is driven and rotated following to the rotation of the drive gear A3 integrally rotated with the counter shaft 76, the following equation is established:

(number of revolutions of driven gear $B3$)=(engine rpm×primary reduction ratio×reduction ratio of third gear position)

Meanwhile, since the driven gear B4 is driven and rotated following to the rotation of the drive gear A4 integrally rotated with the counter shaft 76, the following equation is established:

(number of rotations of fourth driven gear)=(engine rpm×primary reduction ratio×reduction ratio of fourth gear position)

Figure 17:
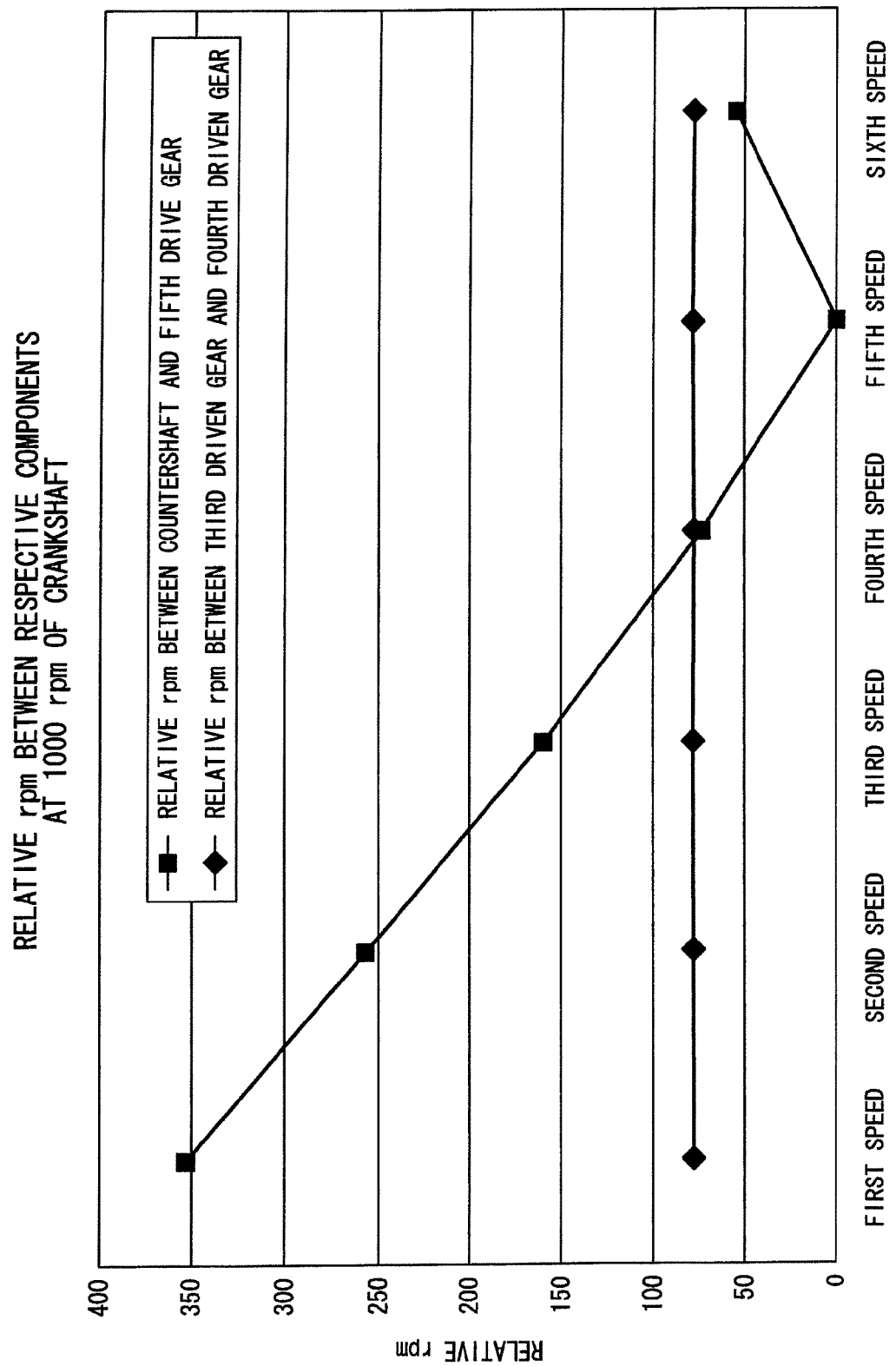
FIG. 17 is a graph showing the relative number of revolution of a drive shaft and a fifth driven gear, and the relative number of revolution of a third driven gear and a fourth driven gear in a transmission of a motorcycle.

As is apparent from the above two equations, a relative number of rotations generated between the driven gear B3 and the driven gear B4 depends on the reduction ratios of the third and fourth gear positions and the engine rpm, and is not influenced by a reduction ratio of a gear position selected at the time of shifting gears. Therefore, if the engine rpm is constant, even in the gear shift operation to any gear position, the relative number of rotations between the driven gear B3 and the driven gear B4 keeps constant (see FIG. 17), and as a result, a rider can obtain a stable and favorable operation feeling.

In addition, by the interposition of the friction ring 120 between the driven gear B3 and the driven gear B4 with the constant relative number of revolutions as described above, it becomes possible to make constant the number of operational rotations of the friction ring 120 in the respective gear positions. Therefore, durability of the friction ring 120 can be enhanced.

Particularly, since the reduction ratios of the third and fourth gear positions are crossed, by fitting the friction ring 120 between the driven gear B3 and the driven gear B4 in an outer peripheral surface of one of the hub portion (see FIG. 17), a difference of the rotating speeds between the gears can be suppressed. As a result, since the number of operational rotations of the friction ring 120 can be suppressed, the durability of the friction gear 120 can be further improved.

Furthermore, in the present embodiment, since the friction ring 120 is arranged closer to the outer diameter side than the hub portion 117 formed at the inner peripheral end portion of the driven gear B4, becomes possible to make larger a diameter of the friction ring 120 as compared with a case where the friction ring 120 is interposed between the counter shaft 76 and the drive gear A5. Therefore, a peripheral speed of the friction ring 120 can be made high to thereby increase the rotation resisting force.

Still furthermore, in the present embodiment, since the friction ring 120 is interposed between the driven gear B3 and the driven gear B4 that are arranged adjacent to each other, the transmission 75 can be prevented from increasing in size. In addition, it becomes possible to shorten the axial dimension of the driven gear B3 and the driven gear B4 by intruding a part of the friction ring 120 into the recessed (concave) portion 118 formed in the surface 116 of the driven gear B4 opposing to the driven gear B3.

Still furthermore, as shown in FIG. 6, according to the present embodiment, the oil supply hole 105d formed in the bush 104d communicates with an attachment position of the friction ring 120 through a sliding contact surface between the bush 104d and the driven gears B3 and B4, and a sliding contact surface between the driven gears B3 and B4 and the washer 103 arranged between the driven gears B3 and B4. Therefore, lubricating performance of the friction ring 120 (particularly, lubricating performance of the lip portion 123) becomes excellent, and a rubber portion can be suppressed from being worn and degraded, thus improving the durability of the friction ring 120. In addition, since the bushes 104d provided at the inner peripheries of the driven gears B3 and B4 are integrated with each other, it becomes possible to suppress collapse of the driven gears B3 and B4.

Still furthermore, in the present embodiment, the drive gears A3 and A4 are integrally formed and serve as the sliding dog gears movable in the axial direction of the counter shaft 76 by the common shift fork 147a. Therefore, it becomes possible to reduce the axial dimension of the drive gears A3 and A4 and to shorten a distance between the driven gears B3 and B4 always meshing with the drive gears A3 and A4, thus enabling to prevent deterioration of a strength of a portion supporting the friction ring 120.

Figure 16:
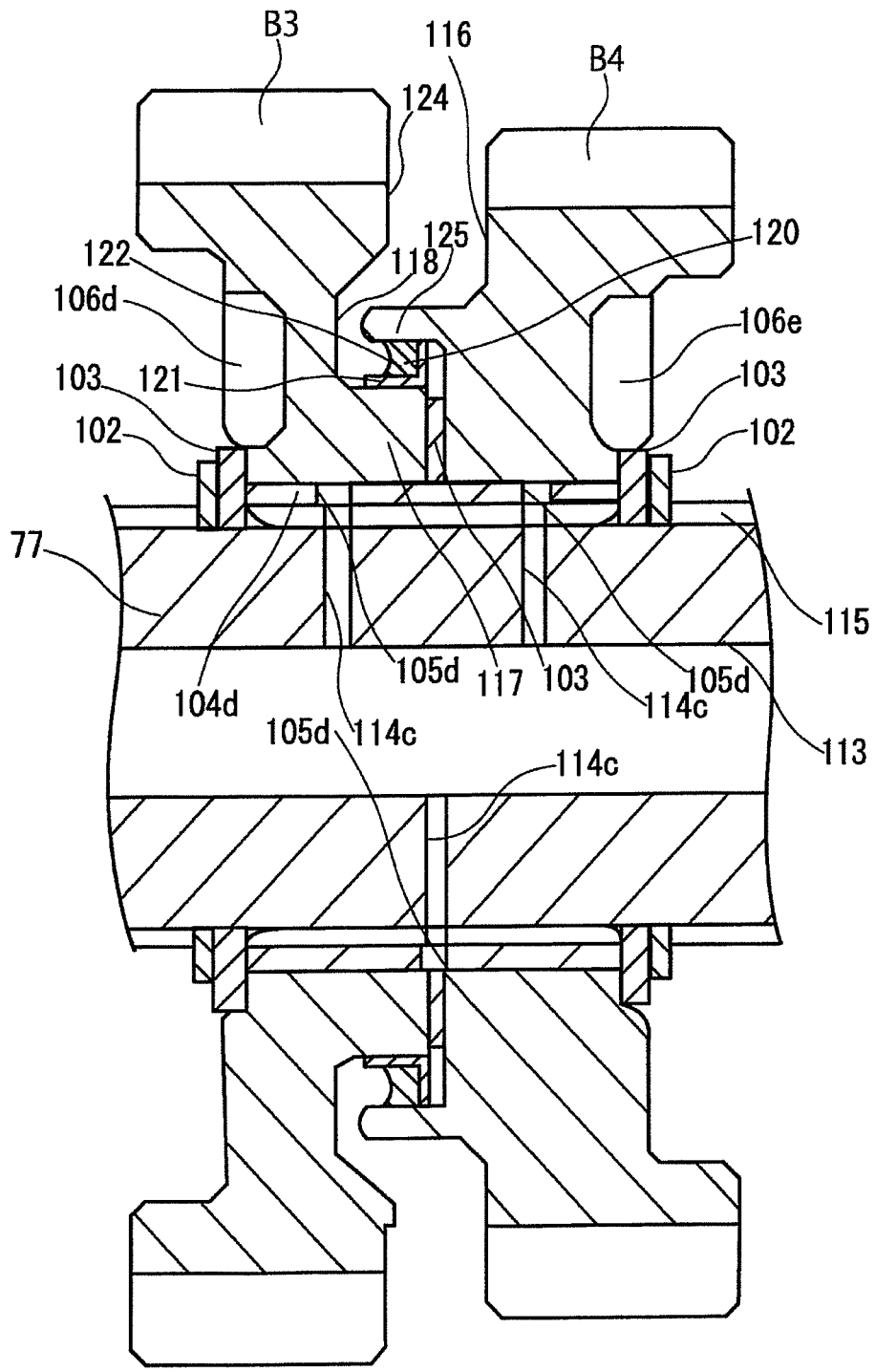
FIG. 16 is a sectional view illustrating a periphery of a third driven gear and a fourth driven gear of a transmission of the motorcycle according to a second disclosed embodiment.

A second disclosed embodiment is shown in FIG. 16.

In the first disclosed embodiment described above, the friction ring 120 is interposed between the paired driven gears B3 and B4, and the recessed portion 118 is formed to the driven gear B4 having a diameter smaller than that of the driven gears B3. In the second embodiment, however, the recessed portion 118 is formed to the driven gear B3 having a diameter larger than that of the driven gear B4. According to such structure of the second embodiment, the friction ring 120 can be made further larger in size to thereby increase the rotation resisting force as well as to make small the axial dimensions of the paired driven gears B3 and B4.

It is further to be noted that the present invention is not limited to the described embodiments and many other changes and modifications may be made without departing from the scopes of the appended claims.

What is claimed is:

1. A transmission for a motorcycle comprising: a counter shaft to which a rotation of a crankshaft disposed in an engine is transmitted; a drive shaft to which a rotation of the counter shaft is transmitted; a pair of drive gears mounted on the counter shaft so as to be rotated integrally with the counter shaft; a pair of driven gears mounted on the drive shaft so as to be meshed with the pair of drive gears, respectively, to be rotatable therewith; and a friction ring interposed between the pair of driven gears, wherein the pair of driven gears have inner peripheral end portions to which a hub portion is provided, and the friction ring is fitted in an outer peripheral surface of one of the hub portion, and wherein the pair of driven gears are arranged adjacent to each other, one of the driven gears is formed with a recessed portion facing another driven gear such that at least a part of the friction ring enters the recessed portion in regard to an axial direction of the drive shaft.

2. The transmission for a motorcycle according to claim 1, wherein the one of the driven gears has an diameter larger than that of the another driven gear, and wherein the friction ring is fitted in an outer peripheral surface of the hub portion of the one of the driven gears, and a friction ring contact portion contacting an outer diameter portion of the friction ring is formed on a surface of the another driven gear facing the one of the driven gears.

3. The transmission for a motorcycle according to claim 2, wherein a bush is interposed between the drive shaft and the pair of driven gears, and the bush is formed with an oil supply hole at a position corresponding to a fitting position of the friction ring in regard to the axial direction of the drive shaft.

4. The transmission for a motorcycle according to claim 3, wherein the pair of drive gears are integrally formed as sliding dog gears movable in an axial direction of the counter shaft by means of a shift fork.

\* \* \* \* \*